May 9, 1939.  A. C. SCHROEDER  2,157,577
WEIGHING MACHINE
Filed Nov. 17, 1934   6 Sheets-Sheet 1

Fig. 1

INVENTOR
Arthur C. Schroeder
BY J. Stanley Churchill
ATTORNEY

May 9, 1939.  A. C. SCHROEDER  2,157,577
WEIGHING MACHINE
Filed Nov. 17, 1934  6 Sheets—Sheet 2

May 9, 1939.  A. C. SCHROEDER  2,157,577
WEIGHING MACHINE
Filed Nov. 17, 1934  6 Sheets-Sheet 3

INVENTOR
Arthur C. Schroeder
BY J. Stanley Churchill
ATTORNEY

Fig. 5

Patented May 9, 1939

2,157,577

UNITED STATES PATENT OFFICE 2,157,577

WEIGHING MACHINE

Arthur C. Schroeder, Syracuse, N. Y., assignor to Pneumatic Scale Corporation, Limited, Quincy, Mass., a corporation of Massachusetts Application November 17, 1934, Serial No. 753,483

4 Claims. (Cl. 249—59)

This invention relates to a multi-scale rotary weighing machine.

The object of the invention is to provide a novel and improved construction of rotary weighing machine having greater productive capacity than other rotary machines of which I am aware.

With this general object in view and such others as may hereinafter appear, the invention consists in the multi-scale rotary weighing machine hereinafter described and particularly defined in the claims at the end of this specification.

In the drawings, Fig. 11 is a sectional detail taken on the line 11—11 of Fig. 6, showing the pawl and ratchet clutch and pawl stops for controlling the operation of the machine; Fig. 12 is a detail view looking from the right in Fig. 6, showing the means for controlling the operation of the secondary shaft and associated mechanisms; Fig. 13 is a wiring diagram to be referred to.

In general, the different features of the present invention are embodied in a multi-scale rotary weighing machine and have been herein illustrated as embodied in a two-scale rotary weighing machine, wherein provision is made for transferring packages or cartons from the single line in which they may be presented to the machine from the usual bottom sealer to a pair of circular guides or tracks. Provision is made for moving each pair of packages or cartons thus transferred by intermittently rotary means to present each pair of cartons first to the bulk loading devices by which separate bulk loads are introduced into the packages and then to weighing scales, one disposed in the path of movement of each package. Provision is made for introducing the final load into the package until each scale makes its weight, and thereafter for initiating the rotary movement of the package moving means to convey the weighed packages from the scales and from the machine. Provision is also made for controlling the operation of the package moving means from the weighing mechanism to the end that movement of the packages will be prevented until both scales make their weight irrespective of whether one scale makes its weight first or the other.

Figure 1:
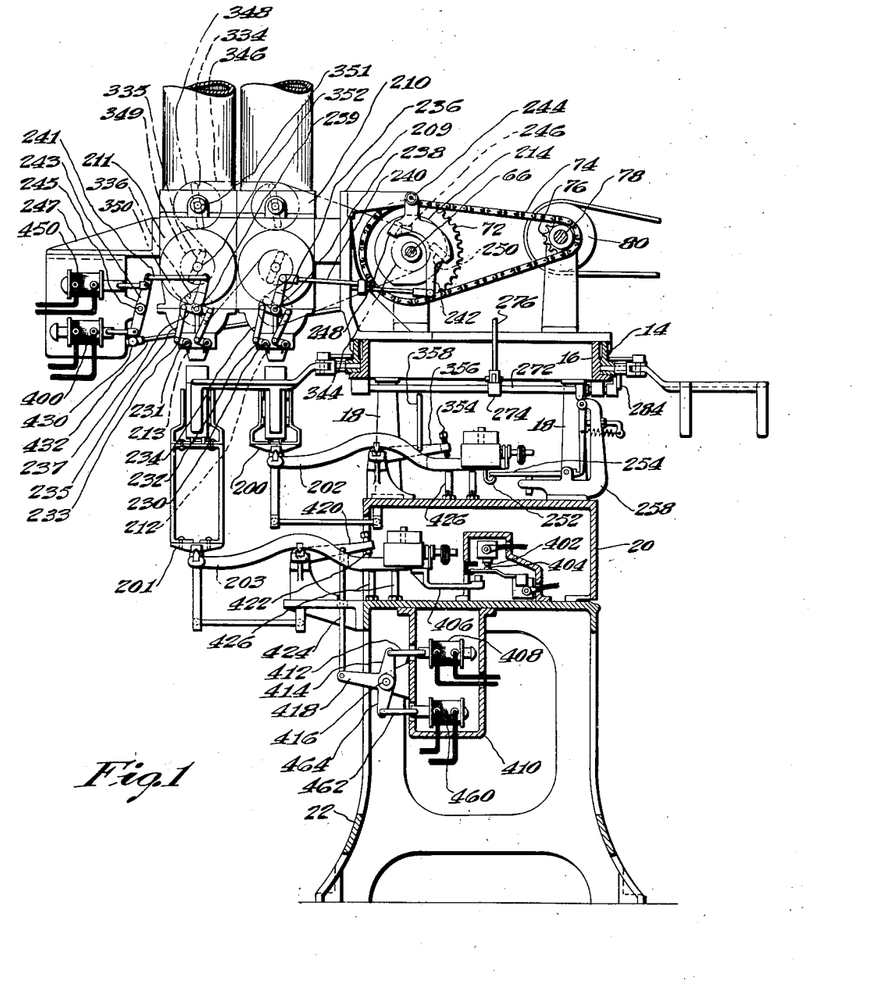
Fig. 1 is a side elevation, partly in section, of a weighing machine embodying the present invention.
Figure 2:
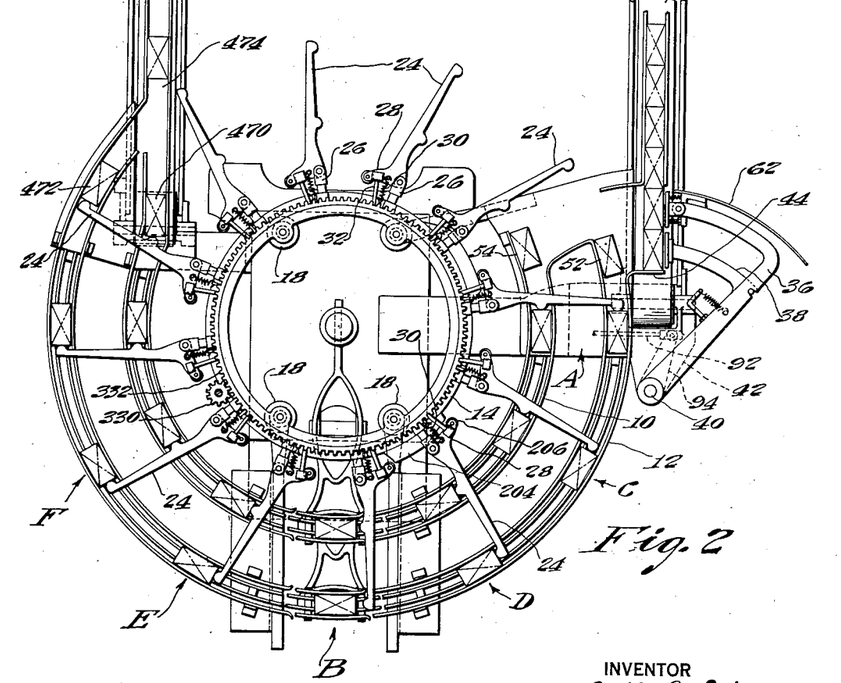
Fig. 2 is a plan view of the machine, with the upper section omitted, showing the package moving means and pushers for transferring the packages from the conveyor to the machine.
Figure 3:
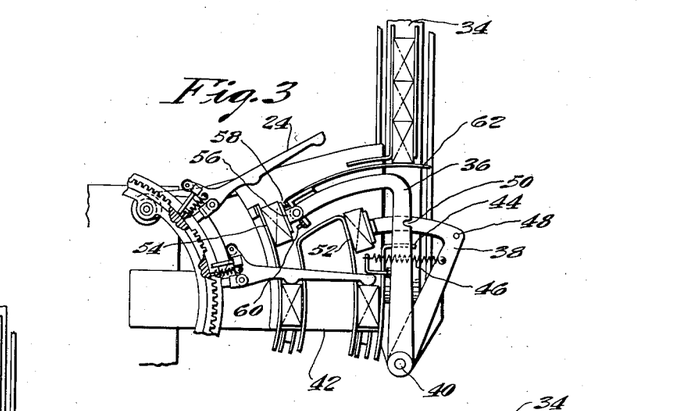
Fig. 3 is a detail view of the pushers in a different position of operation.
Figures 4, 10:
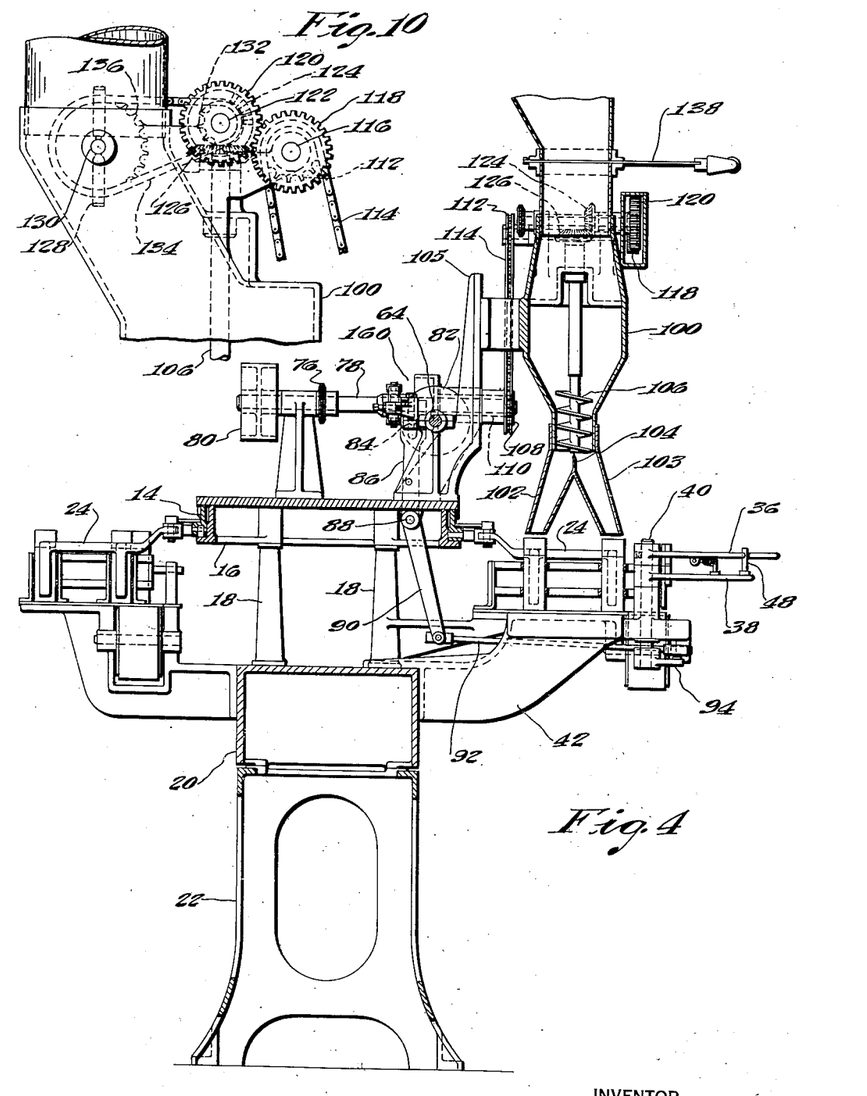
Fig. 4 is a sectional front elevation of the machine showing the load forming means.
Fig. 10 is a detail view of the loading hopper driving unit, looking from the right in Fig. 4.

Referring now to the drawings which as above stated illustrate the invention as embodied in a two-scale rotary weighing machine, the machine is provided with two circular track members 10 and 12, see Fig. 2, adapted to support and guide successive packages in two concentric and circular paths, and provision is made for intermittently moving successive pairs of packages through said guideways and in a circular path in order to present each pair of packages first to a bulk loading station A and then to intermediate stations C and D and thereafter to a weighing station B where each package is independently weighed and the final load introduced therein. As herein shown the rotary package moving means includes a rotatable member comprising a ring 14 having a bearing upon a stationary supporting ring member 16. The stationary supporting ring member 16 is mounted upon and supported by four posts 18 mounted upon a platen 20 supported upon the top of the base 22 of the machine, as illustrated in Figs. 1 and 4. The rotary ring member 14 is provided with a plurality of radially arranged pusher members 24 of a length sufficient to extend across the two circular tracks or guideways 10 and 12 and to engage each pair of packages to effect the movement thereof through said circular guideways as the pusher members 24 are rotated with the rotary ring 14. Each pusher member 24 comprises a bell crank pivoted upon a stud 26 secured to and projecting outwardly from the rotary ring member 14, and the shorter arm 28 of the bell crank is connected by a spring 30 to the rotary ring member in order to yieldingly hold each pusher member 24 in its rearward position and the shorter arm of the bell crank is also provided with a cam roller for a purpose to be described and with a stop pin 32 which is arranged to limit the rearward movement of the pusher member under the influence of the spring, and will be apparent from an inspection of Fig. 2. In order to transfer the packages from a single line on an incoming conveyor 34 to positions on the circular tracks 10 and 12 in alignment with the pusher members 24, a pair of transfer arms 36 and 38 are provided, see Figs. 2, 3 and 4. The transfer arms which are mounted on a vertical rocker shaft 40, journaled in a suitable bearing in a supporting bracket 42, secured to the machine frame, are normally in their extreme outward positions as shown in Fig. 2. In these positions the packages on the incoming conveyor 34 are permitted to come up against a stop member 44 which positions the two foremost packages immediately in front of the transfer arms 36 and 38. The upper transfer arm 36 is fixed to the rocker shaft 40 and the lower arm 38 loosely mounted on the rocker shaft 40 is operatively connected to the arm 36 by a spring 46. A stud 48 fixed to the lower arm 38 is arranged to engage with a slot 50 in the upper arm 36. Upon movement of the rocker shaft 40, as will be described, the parts will assume a position shown in Fig. 3. The foremost package or carton will be positioned against the outer guide rail at 52 and the second package will be transferred to the inner guide rail at 54. As shown in Fig. 3, the arms 36 and 38 will travel as a unit until the foremost carton strikes against the rail at 52 and upon subsequent movement of the rocker shaft 40 the arm 36 will leave the arm 38, and the spring 46 will be extended. In order to yieldingly position the second carton against the rail 54 in alignment with the pusher members 24, the transfer arm 36 is provided with a rocking member 56 which is caused to yield in one direction as illustrated in Fig. 3 by provision of a compression spring 58 interposed between the rocking member 56 and the arm 36. In its normal position the other side of the rocking member 56 is held against a stop 60 secured to the arm 36. On the return stroke of the arm 36, the slot 50 again engages the stud 48 in the arm 38 to return both arms to normal position as shown in Fig. 2. During the transferring operation the remaining cartons on the conveyor are held back by a curved bar 62 secured to the transfer arm 36, and upon completion of the transfer operation the cartons are again permitted to come forward against the stop 44 in alignment with the pusher members 36 and 38.

The transfer arms above referred to are actuated by mechanism controlled by a secondary shaft 64 herein shown as rotated by a main shaft 66 through cooperating bevel gears 68 and 70. Fixed to the main shaft 66 is a sprocket 72 over which a chain 74 runs. The chain 74 also runs over a sprocket 76 fixed to a driving shaft 78 which is rotated through any suitable means such as an electric motor, not shown, belted to a pulley 80 fixed to the driving shaft 78 as shown in Figs. 1 and 5.

Figure 5:
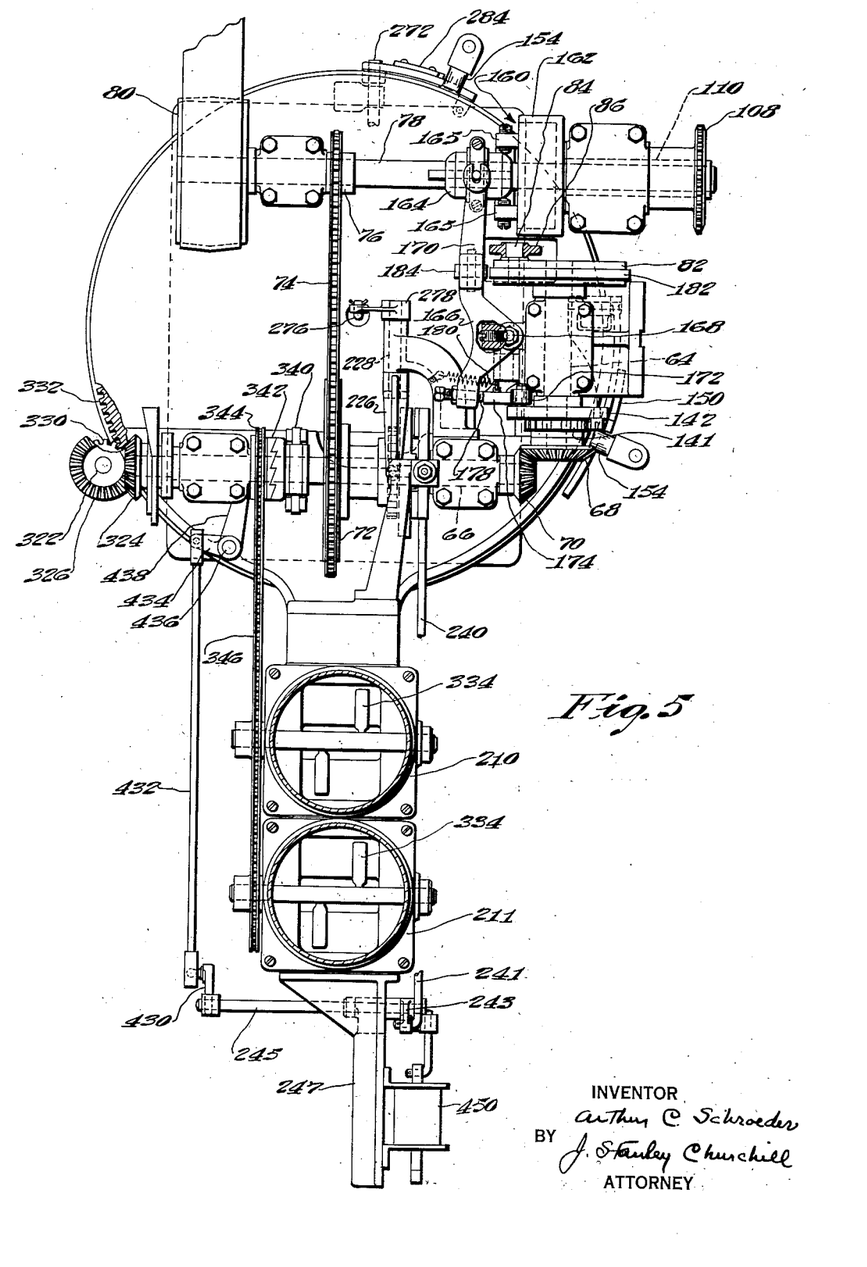
Fig. 5 is a plan view of the driving mechanism.

Referring now to Figs. 2, 4 and 5, the secondary shaft 64 is connected with the transfer arms 36 and 38 through a crank disc 82 fixed to the secondary shaft. The crank disc 82 is provided with a roll 84 which engages with a slot in one arm 86 of a two-armed lever pivoted on a stud 88 in the stationary ring 16. The other arm 90 of the two-armed lever is connected by a link 92 to a lever 94 fixed to the lower end of the rocker shaft 40.

From the description thus far it will be observed that during the rotation of the rotary ring member 14 the pair of cartons which have been transferred to the circular guideways 10 and 12 are advanced to the bulk loading station A where separate bulk loads are introduced therein. The material is fed from a bulk supply into a worm hopper 100 which is supported on a bracket 105 mounted on the stationary ring 16. The worm hopper 100 is provided with two funnels 102 and 103 at its lower end through which the material flows into the separate packages. A dividing blade 104 formed as part of the funnel members is located immediately beneath the worm 106 and is adapted to divide the load into substantially equal quantities.

Provision is made to drive the worm 106 to feed the material through the hopper 100 and into the cartons and for this purpose a sprocket 108 fixed to an elongated bushing 110 loosely mounted on the driving shaft 78 is connected to a sprocket 112 by a chain 114, see Figs. 4 and 10. The sprocket 112 is fixed to one end of a shaft 116 which is journaled in suitable bearings in the hopper frame. Fixed on the other end of the shaft 116 is a spur gear 118 which meshes with a spur gear 120 fixed to a shaft 122. The shaft 122 is connected to the worm 106 through cooperating bevel gears 124 and 126. Stirrer members 128 fixed to a shaft 130 are rotated during the loading operation by a sprocket 132 fixed to the shaft 122, a chain 134 which runs over the sprocket 132, and a sprocket 136 fixed to the stirrer shaft 130 over which the chain 134 also runs. A shutter 138 is provided between the bulk supply and the hopper so that the supply may be shut off when it is desired to clean the hopper.

Figure 6:
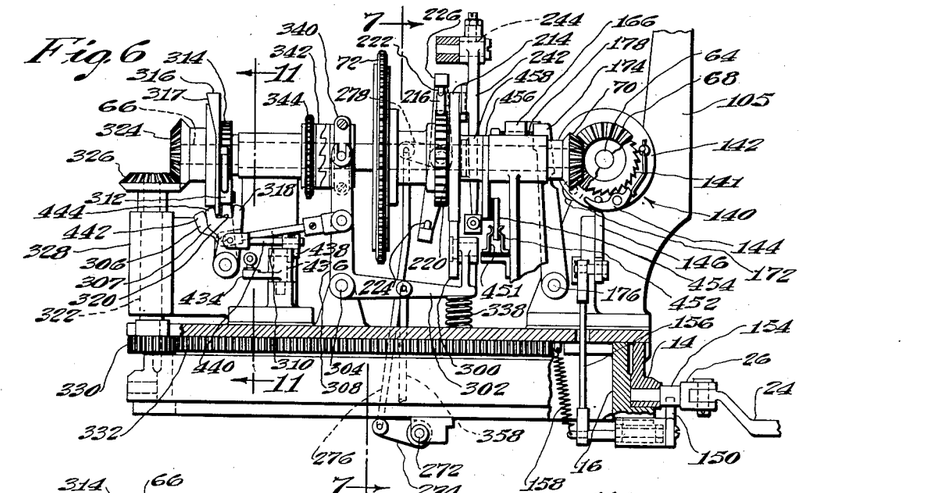
Fig. 6 is a front elevation of the driving mechanism showing the mechanism for controlling the operation of the package moving ring.
Figures 11, 12, 13:
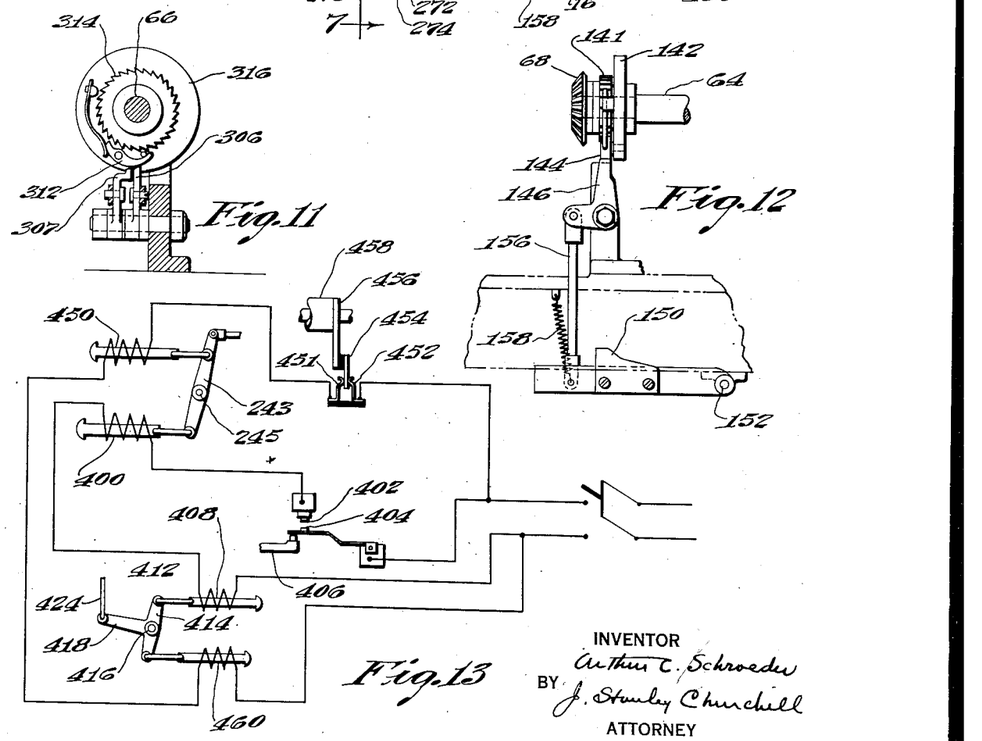

During the operation of the machine the bulk loading hopper 100 and the transfer members 36 and 38 are controlled so that material will be fed and packages transferred only when the pusher members 24 are at rest. For this purpose a pawl and ratchet clutch 140 is provided on the secondary shaft 64. The ratchet 141 formed as part of the bevel gear 68 is loosely mounted on the shaft 64. A disc 142 fixed to the shaft 64 carries a spring pressed pawl 144 which is arranged to engage with the teeth of the ratchet 141. In order to control the rotation of the secondary shaft 64 a pawl stop 146 is provided which is arranged to be withdrawn just prior to the time when the pusher members 24 come to rest. For this purpose, as illustrated in Figs. 6 and 12, a cam member 150 pivoted at 152 on the stationary ring 16 is arranged to be depressed by a roll 154 on the pusher stem just prior to the time when each pusher comes to rest. The cam member 150 is operatively connected to the pawl stop 146 by a link 156. A spring 158 normally urges the pawl stop to the right, viewing Fig. 12, so that the shaft 64 will come to rest at the end of one revolution.

The bulk loading hopper is adjustably controlled so that the rotations of the worm 106 will cease when a predetermined quantity of material has been fed into the cartons and for this purpose a split ring clutch 160 is provided. The driven member 162 of the clutch is formed as part of the elongated bushing 110 above referred to and a driving hub 164 adapted to engage the fingers 165 of the split ring 160 is slidably keyed to the driving shaft 78.

As illustrated in Figs. 5 and 6, the clutch 160 is operated and controlled by a shifter 166 frictionally pivoted at 168. The hub 164 is arranged to be engaged by one arm 170 of the shifter. The clutch 160 is arranged to be thrown in by connections including a roll 172 carried by the disc 142 above referred to and a lever 174 pivoted at 176 on the hopper bracket 105. The upper end of the lever 174 is arranged to engage a set screw 178 provided in the other arm of the shifter 166. In this manner, when the secondary shaft 64 is permitted to rotate, the roll 172 will come in contact with the lever 174 and urge the shifter 166 to throw the clutch in. The lever 174 is normally held in contact with the set screw 178 by a spring 180.

The clutch 160 is arranged to be thrown out by a cam 182 adjustably mounted on the secondary shaft 64 adjacent to the crank disc 82. The cam 182 is adjusted on the shaft 64 so that when a predetermined amount of material has been fed into the packages the cam will come in contact with a roller 184 carried by the arm 170 of the shifter and cause it to be moved to the left, viewing Fig. 5. The clutch will remain in its inoperative position until again acted upon by the lever 174.

In general, the operation of the machine takes place in cycles, and in each cycle a portion of the time is devoted to the movement of the packages and the remainder of the cycle is devoted to the weighing and bulk loading operations. After the bulk loading operation has been completed the packages are intermittently advanced first to a station C and then to station D where the bulk loads may be subjected to suitable vibrating or shaking means, not shown, whereby the goods may be settled into the package to allow room in the package for the deposition of a drip stream or final load at the weighing station B.

At station B, the packages come to rest on the scale pan ends 200 and 201 of the individual scale beams 202 and 203. In order to release each package pusher 24 from its pair of packages at the weighing station B, a stationary cam member 204 carried by the stationary ring 16 above referred to is arranged to engage a cam roller 206 upon the pivoted pusher arm 28 and to swing the pusher arm through a short arc to advance or accelerate the movement of the packages at or about the time that the packages are being delivered onto the scale pans 200 and 201 of the individual scales. The stationary cam 204 is so designed that as the packages are thus moved onto the scale beams the cam roll 206 drops from the cam and permits the spring 30 to swing the pusher arm to the right, viewing Fig. 2, and out of contact with the surfaces of the packages to thereby release the packages or free them to permit the weighing operation to be performed.

As herein shown, see Fig. 1, the final load mechanism comprises two drip hoppers 210 and 211 suitably secured to a bracket 209 mounted on the machine frame, and for purposes of illustration only the inner drip hopper 210 and weighing scale 202 are shown as being operated mechanically while the outer drip hopper 211 and weighing scale 203 are herein shown as being controlled electrically.

The mechanically operated weighing unit will now be described and, as illustrated, the drip hopper 210 is provided at its lower end with a pair of shutters 212 by means of which the flow of material from said hopper is controlled, through connections which will be described, from the main shaft 66. To this end a cam member 214 is loosely mounted on the shaft 66 and a pawl 216 pivoted on said cam member is normally urged by a spring 218 into engagement with a ratchet 220 secured to said control shaft and forming a part of the driven sprocket 72 above referred to, see Fig. 6. The pawl and ratchet comprises a clutch for driving the cam 214 controlling the various operations of the machine, as will be described. The pawl 216 is disengaged from the teeth of its ratchet 220 by either of two pins 222, 224 mounted in a yoke 226, the yoke being pivoted upon a shaft 228 secured to the machine frame. The yoke is oscillated as will be described in a direction longitudinally of the control shaft 66 to present either the upper or lower pin 222, 224 upon the yoke 226 in the path of the pawl 216 of the pawl and ratchet clutch. When the yoke is rocked counter-clockwise, viewing Fig. 6, to move the upper pin 222 out of the path of the pawl 216 the spring 218 operates to cause the nose of the pawl 216 to engage the teeth of its ratchet 220 and the ratchet operates to drive, through the pawl 216, the cam disc 214 through one half a revolution. When the yoke is rocked, as above described, the lower pin 224 of the yoke is positioned in the path of the pawl 216, so that at the end of the half revolution of the cam disc 214, the pawl 216 is disengaged from its ratchet 220 and remains disengaged until the lower pin 224 is moved out of the path of the pawl when the yoke is rocked in the reverse direction, as will be described.

As above stated, the drip hopper 210 is provided with a pair of shutters 212 for controlling the flow of material therefrom, and provision is made for opening and closing said shutters at the start and end of the weighing operation. To this end the shutters 212, shown in open position in Fig. 1, are secured to rock shafts 230 journaled in the hopper 210 and arms 232 also secured to the shafts 230 are connected by links 234 to opposite arms of a rock lever 236 pivoted on a shaft 238.

In order to rock the lever 236 to open and close the shutters 212, a link 240 is connected between a third arm of said lever and the lower end of a rock lever 242 frictionally mounted on a fixed stud 244. When the scale 202 has made its weight the yoke is rocked in a counterclockwise direction, viewing Fig. 6, in a manner to be described, and the cam disc 214 is thereby permitted to rotate through one-half a revolution, and an abutment 246 on the face of said cam disc engages an abutment 248, formed on the rock lever 242, and rocks said lever in a clockwise direction, viewing Fig. 1, to move the shutters 212 into their closed position through the connections previously described. In order to open the shutters 212 to permit material to be discharged from the hopper 210 into the carton the yoke 226 is rocked in a clockwise direction, viewing Fig. 6, and the cam disc 214 is permitted to rotate through another half revolution during which the abutment 246 on said disc engages an abutment 250 on the adjacent rock lever 242 and rocks said lever in a counterclockwire direction, viewing Fig. 1, to thereby open the shutters.

When the scale has made its weight, the scale beam 202 is depressed and provision is made for operatively connecting the scale beam with the yoke 226 in order to rock the yoke in a counterclockwise direction, viewing Fig. 6, and to position the lower stop pin 224 in the path of the tail of the pawl 216 and at the same time to remove the upper pin 222 from engagement with the pawl to thereby permit the cam disc 214 to make one-half a revolution, or, in other words, to start the machine on its next one-half cycle of operation. As herein shown, see Figs. 7, 8 and 9, the end of the scale beam is provided with a finger 252 which is adapted to engage the end of a counterweighted lever 254 when the scale beam makes its weight and to deflect the lever 254 into the position illustrated in Fig. 9. The lever 254 is pivoted at 256 in a bracket 258 secured to the machine frame, and the second end of the lever 254 is provided with a notched portion 260, adapted when the lever is deflected into the position of Fig. 9, to permit a latching lever 262 to swing into the position illustrated in Fig. 9. The lever 262 is pivoted at 264 in an arm at 266 formed as a part of the bracket 258. The upper end of the lever 262 is provided with a cam surface 268 which normally engages a cam block 270 fast upon a cross-shaft 272, see Fig. 7, and the cam surface 268 is adapted to hold the cam block 270 in an elevated position and to thereby hold the shaft 272 in a position corresponding to the position of the yoke 226 in its extreme position to the right as shown in Fig. 6, through connections including a lever 274 fixed to the cross-shaft 272 connected by a link 276 to a lever 278 fixed to the yoke shaft 228. The cross-shaft 272 is rocked to this position at the end of the half cycle, during which the packages have been moved upon the scale beams, by a resetting mechanism, to be described. When the shaft 272 is held by the cam 268 in an elevated position, the end of the lever 262 will engage the end of the lever 254, the parts being illustrated in this position in Fig. 7, and corresponding to the normal position of the scale beams at the start of the weighing operation. When the scale beams make their weight, the lever 254 is rocked into the position shown in Fig. 9 and the cam block 270 operated by the weight of the lever 274 and link 276 operates to cam the upper end of the lever 262 from the position shown in Fig. 7 to that shown in Fig. 9, thus permitting the shaft 272 to be rocked downwardly by the weight of parts 274, 276 and, consequently, to permit the yoke 226 to be rocked in a counterclockwise direction.

Figures 7, 14:
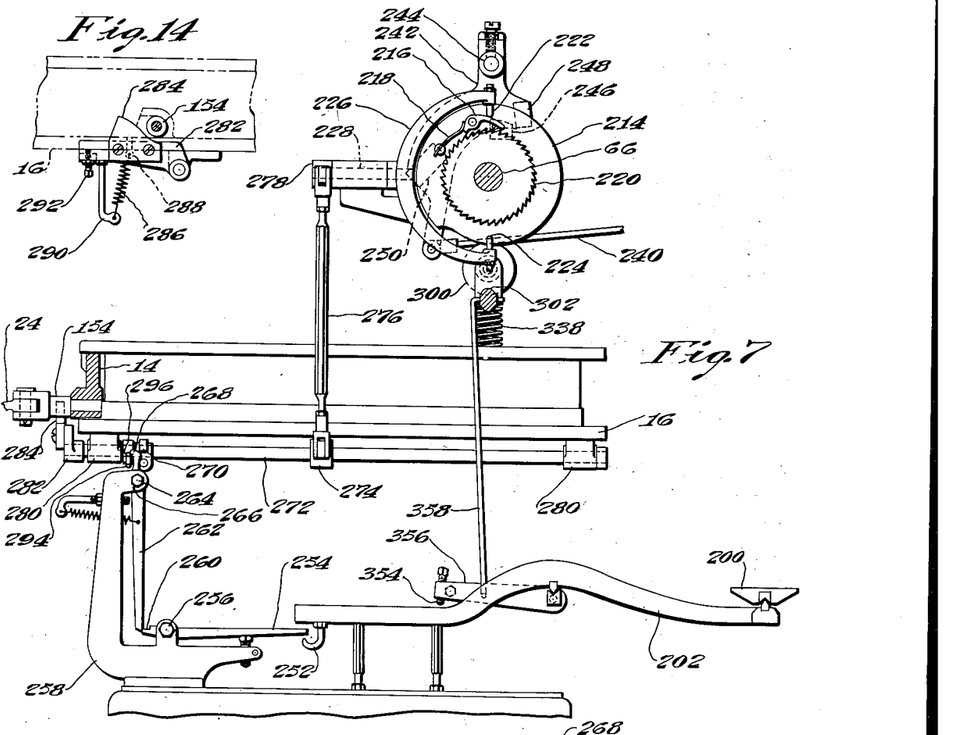
Fig. 7 is a detail in section taken on the line 7—7 of Fig. 6 including the scale controlling mechanism.
Fig. 14 is a detail in side elevation looking from the left in Fig. 7, showing the resetting cam for the scale controlling mechanism.
Figures 8, 9:
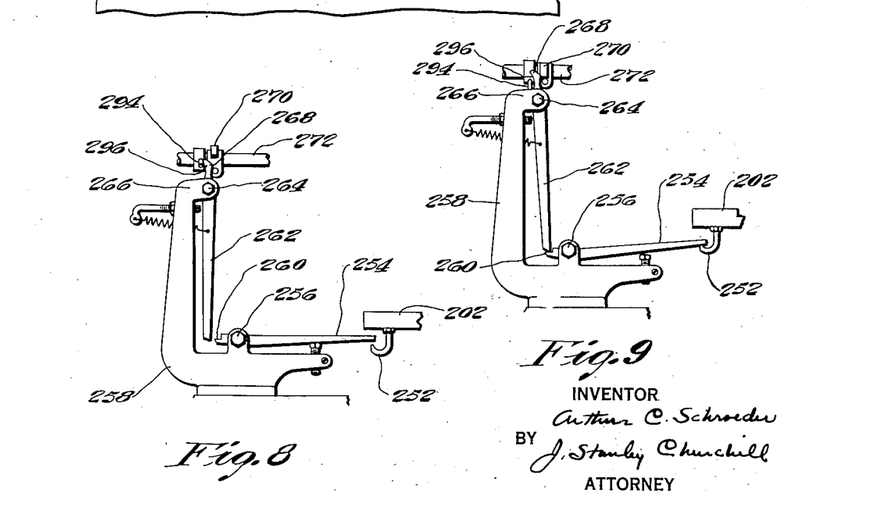
Figs. 8 and 9 illustrate in side elevation the scale controlling mechanism in different positions of operation.

After the scales have made their weights, the packages are advanced to the next station, through connections to be described, and this movement of the pusher arms 24 is utilized to rock the shaft 272 to its reset position as shown in Fig. 7. For this purpose the cross-shaft 272, journaled in suitable bearings 280 on the under side of the stationary ring 16, is provided with a lever 282 at its outer end. The lever 282 is provided with a cam piece 284 which is arranged to be depressed by the roll 154 on the pusher stem just prior to the time when the pusher members 24 come to rest. The cam piece 284 is normally urged into its elevated position by a spring 286, one end of which is connected to a stud 288 in the stationary ring 16 and the other end to a stud 290 in the lever 282. The outer end of the lever 282 is provided with a set screw 292 which comes in contact with the under side of the stationary ring 16, to limit the upward movement of the cam piece 284. This rocking movement of the shaft 272 will operate to again elevate the cam block 270 into the position shown in Fig. 7. When this occurs, a pin 294 engages the cam surface 296 on the under side of the upper end of the lever 262 and, consequently, swings the lever 262 to an intermediate position illustrated in Fig. 8, thereby permitting the lever 254 to assume a horizontal position and thereafter the cam block 270 will again engage the cam surface 268 and the parts will assume a reset position, such as is illustrated in Fig. 7, in which the end of the lever 262 engages the end of the lever 254 and in which the scale is ready for the succeeding weighing operation.

Mechanism is provided for controlling the machine so that it will not start upon the second half of its cycle of operation until both scales have completed their weights. For this purpose the inner or mechanically operated weighing unit is operatively connected to the movable ring driving mechanism and, as herein shown, see Fig. 6, the cam disc 214 has cooperating with it a cam roller 300 upon the end of an arm 302 pivoted upon a rock shaft 304. The arm 302 is directly connected to one of two pawl controlling latches 306, 307, the outer latch 307 being controlled by the outer scale to be described. The inner scale is connected to the latch 306 through an arm 308 and link 310. Both pawl controlling latches 306, 307 are arranged to cooperate with a single pawl 312 of a pawl and ratchet clutch, the ratchet 314 being fast upon the shaft 66, and the pawl 312 mounted upon a pawl carrying disc 316 loosely mounted on the shaft 66 and arranged to be driven by the pawl and ratchet clutch 312, 314. The pawl controlling latches 306, 307 are designed so that each is provided with a pawl engaging portion 318 for holding the pawl out of engagement with the ratchet, and with a recessed portion 320 adapted to permit the free rotation of the pawl without disengagement from the ratchet. When both pawl controlling latches 306, 307 are swung to the right and into an aligned position, viewing Fig. 6, the pawl and ratchet clutch 312, 314 is permitted to remain in engagement and, hence, to drive the disc 316. The disc 316 is connected to a vertical shaft 322 by bevel gears 324, 326. The bevel gear 324 is formed as a part of the disc 316 and the bevel gear 326 is mounted upon the upper end of the shaft 322. The shaft 322, journaled in a bracket 328 on the machine frame, is provided with a spur gear 330 at its lower end which meshes with the gear teeth 332 cut in the rotary ring 14. Consequently, the movements of the packages at the start of the second half of each cycle of operation of the machine cannot take place unless the pawl controlling latches 306, 307 are in their inoperative position, or, in other words, are swung to the extreme position to the right, viewing Fig. 6, to permit the pawl 312 to remain in engagement with its ratchet 314. This condition, as will be described, only obtains when both scale beams 202, 203 have completed their weights and have been reset.

Provision is made for driving stirrer members 334, 335, 336 provided in the hoppers 210, 211 and, as herein shown, when the yoke 226 is rocked in a clockwise direction by the cam 284 through the connections described, the pawl 216 and the cam disc 214 are rotated through one-half a revolution at the end of which the tail of the pawl 216 is engaged by the pin 222 on the upper part of the yoke 226, thus permitting the cam roll 300 and arm 302 to be raised by a spring 338 and operates to rock the arm 308 carrying a movable clutch member 340 which is splined to the control shaft 66 to move said clutch member into engagement with a clutch member 342 loosely mounted on the shaft 66. A sprocket 344 is secured to the clutch member 342, and said sprocket is connected through a chain 346, Fig. 1, to sprockets 348, 349, 350, secured to shafts 351, 352, 238, which carry the stirrer members 334, 335, 336 in the hoppers 210, 211, to loosen the material therein and aid the feeding thereof.

During the portion of each cycle of operation of the machine in which the cartons are being moved onto the scale pans, the scale beam 202 is locked by a set screw 354 on a lever 356, the latter being held down by the cam 214 through the roller 300 and arm 302, see Fig. 1. The arm 302 is connected to the lever 356 by a link 358. After the cartons have been positioned, the set screw 354 and lever 356 are raised by the spring 338 under the arm 302, see Fig. 6, to unlock the scale beam preparatory to the start of the weighing operation.

Having thus described the operation of the mechanical weighing unit the outer or electrically controlled weighing unit will now be described. The hopper 211 is provided with a pair of shutters 213 similar to those described on the hopper 210. The shutters 213, shown in open position in Fig. 1, are secured to rock shafts 231 journalled in the hopper 211 and arms 233 also secured to the shafts 231 are connected by links 235 to opposite arms of a rock lever 237 pivoted on a shaft 239.

In order to rock the lever 237 to open and close the shutters 213, a link 241 is connected between a third arm of said lever and the upper end of a rock lever 243 mounted on a rock shaft 245 journaled in suitable bearings in a depending bracket 247 attached to the hopper 211. When the scale 203 has made its weight, provision is made to close the shutters electrically, through connections including a solenoid 400, see Fig. 13, which is energized to rock the lever 243 counterclockwise when the circuit is closed at the contact points 402 and 404. When the scale 203 makes its weight the counterweight end of the beam is elevated and an extension 406 secured to the end of the scale beam is arranged to close the circuit at the contact points 402 and 404. At the same time provision is made to lock the scale beam 203 and, as herein shown, a solenoid 408, suitably mounted in a depending bracket 410 on the machine frame, is also energized, when the contacts 402, 404 are closed. A link 412 connects the armature of the solenoid 408 to one arm 414 of a three-armed lever which is pivoted on a stud 416 secured to the bracket 410. The horizontal arm 418 of the lever is connected to a locking lever 420, which is provided with a set screw 422, by a link 424. The scale is locked against the usual stops 426 secured to the machine frame.

When the shutters 213 are closed provision is made to withdraw the latch 307 from engagement with the pawl 312 so that the pawl and ratchet clutch may operate to advance the cartons to the next station through the connections described. To this end a lever 430 fixed to the rock shaft 245 is connected by a link 432 to one arm 434 of a bell crank which is pivoted on a stud 436 secured to the machine frame, see Figs. 5 and 6. The other arm 438 of the bell crank is directly connected to the latch 307 by a link 440.

Through the connections described, when the scale 203 has made its weight, the pawl controlling latch 307 is rocked to the right, as viewed in Fig. 6. Assuming that both scales 202, 203 have made their weight and the pawl carrying disc 316 has started its revolution, provision is made for resetting both latches 306, 307 and for this purpose the disc 316 is provided with a cam surface 317 which is adapted to engage lugs 442, 444 provided on the latches 306, 307 and to thereby rock said latches to the left, viewing Fig. 6, so that the pawl 312 will be disengaged from its ratchet 314 at the end of one revolution.

In order to open the shutters 213 at the start of the weighing operation so that material may be permitted to flow into the carton on the scale pan 201, a solenoid 450 is provided which is arranged to be energized when two contacts 451, 452 are closed. The contacts 451, 452 are closed by a contacting member 454 attached to and insulated from a rotating member 456. The member 456 is secured to the hub 458 of the cam disc 214, previously referred to. The contacting member 454 is arranged to close the contacts 451, 452 at the same time the abutment 246 on the disc 214 comes in contact with the abutment 250 on the rock lever 242 to open the shutters 212 on the hopper 210, so that in this manner, both sets of shutters 212, 213 are opened at substantially the same time. At the same time, a solenoid 460 located directly beneath the solenoid 408 is energized to unlock the scale beam 203 preparatory to the weighing operation. The armature of the solenoid 460 is connected by a link 462 to the third arm 464 of the three-armed lever and through the connections previously described the lever 420 is elevated to thereby unlock the scale 203.

After the weighing operation is completed, the packages are advanced to stations E and F where additional settling devices may be located if desired (not shown), and thereafter the packages are advanced to positions as shown in Fig. 2, at 470 and 472, where the package on the inner rail 10 is pushed onto an outgoing conveyor 474 and carried away from the machine. On the next cycle the pusher arm 24 advances the package at 472 to a position on the moving conveyor 474 so that in this manner the packages on the tracks 10 and 12 are alternately removed from the machine and returned to a single line.

While the preferred embodiment of the invention has been herein illustrated and described, it will be understood that the invention may be embodied in other forms within the scope of the following claims.

Having thus described the invention, what is claimed is:

1. A rotary weighing machine having, in combination, rotary means for moving a plurality of sets of packages in concentric paths of different radii to move a package of each set into and from weighing position, means for depositing a bulk load in each set of packages while engaged by said moving means, a plurality of scales for performing the weighing operation, control mechanism operatively connecting the package moving means and scales for preventing the initiation of movement of the packages until after both scales have made their weights, and means for transferring the packages from a single line conveyor into operative engagement with said rotary conveying means.

2. In a rotary weighing machine, in combination, two circular tracks for guiding packages in separate circular paths through the machine, means for transferring alternate packages to each circular track, rotary means for intermittently moving the packages around said tracks, means for introducing bulk loads into the packages being thus conveyed, and two scales, one disposed in the path of movement of each set of packages for performing the weighing operation, and control mechanism operatively connecting the package moving means and scales for preventing the initiation of movement of the packages until after both scales have made their weights.

3. In a rotary weighing machine, in combination, a rotary member, means for intermittently rotating the same, a plurality of elongated package moving members mounted upon and extended in a general radial direction from the rotary member, circular guideways for two sets of packages and across which said package moving members are extended whereby to simultaneously move both sets of packages upon rotation of the rotary member, and two scales, one disposed in the path of movement of each set of packages, and connections between the scales and the package moving means for controlling the operation of the latter from the weighing operation.

4. In a rotary weighing machine, in combination, two circular tracks for guiding packages in separate circular paths through the machine, means for transferring alternate packages to each circular track, rotary means for intermittently moving the packages around said track, means for introducing bulk loads into the packages being thus conveyed, two scales, one disposed in the path of movement of each set of packages for performing the weighing operation, and a discharge conveyor arranged with respect to said circular tracks and the intermittently movable package moving means whereby said package moving means operates to deposit one package from one circular track onto the discharge conveyor at the end of one increment in its movement, and to thereafter during the next increment of its movement effect movement of the second package from the second track onto the discharge conveyor.

ARTHUR C. SCHROEDER.